United States Patent [19]
Ekkert

[11] Patent Number: 6,126,026
[45] Date of Patent: Oct. 3, 2000

[54] CLOSURE WITH MOLD RETAINING PROJECTION

[75] Inventor: Len Ekkert, Naperville, Ill.

[73] Assignee: Phoenix Closures, Inc., Naperville, Ill.

[21] Appl. No.: 09/107,625

[22] Filed: Jun. 30, 1998

[51] Int. Cl.[7] .................................................. B65D 41/04
[52] U.S. Cl. ........................ 215/329; 215/354; 425/809; 249/59
[58] Field of Search ..................................... 215/316, 317, 215/321, 329, 341, 343, 344, 354, DIG. 1; 425/438, 577, 556, 809, DIG. 58; 249/59

[56] References Cited

U.S. PATENT DOCUMENTS

| | | | |
|---|---|---|---|
| 4,090,631 | 5/1978 | Grussen | 215/329 |
| 5,307,945 | 5/1994 | Hidding et al. | 215/329 |
| 5,385,252 | 1/1995 | Hidding et al. | 215/344 X |
| 5,630,522 | 5/1997 | Montgomery | 215/344 |
| 5,762,218 | 6/1998 | Sachau | 215/354 X |
| 5,782,369 | 7/1998 | Tansey | 215/344 |
| 5,871,111 | 2/1999 | Pfefferkorn et al. | 215/344 X |

*Primary Examiner*—Nathan J. Newhouse
*Attorney, Agent, or Firm*—Welsh & Katz, Ltd.

[57] ABSTRACT

A molded closure for use with a container includes a top wall defining a generally planar inner surface and a skirt depending from the top wall generally perpendicular thereto. The skirt includes a container engaging member formed therein. The closure includes a retaining projection formed in the top wall contiguous with the inner surface and extending therefrom inwardly of the closure. The projection extends from the surface perpendicular thereto and defines at least a pair of mold binding surfaces perpendicular to the top wall surface. The binding surfaces are formed in facing relation to one another. The closure is formed in a heated state, and as the closure cools, at least the binding surfaces exert a binding force on the mold block at a location forming a part of the projection to momentarily retain the closure bound to the molding apparatus.

7 Claims, 2 Drawing Sheets

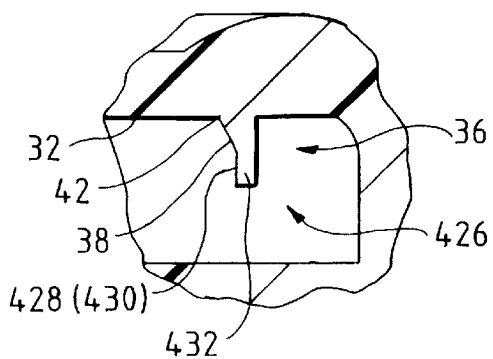
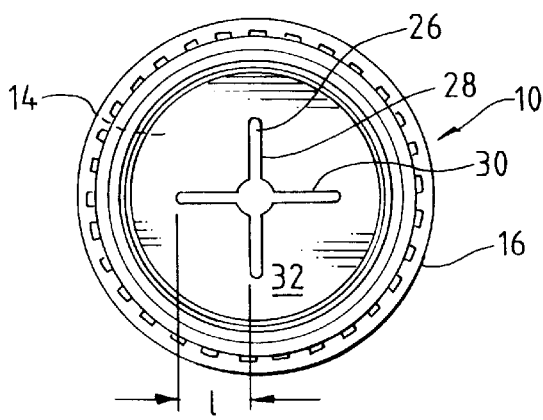
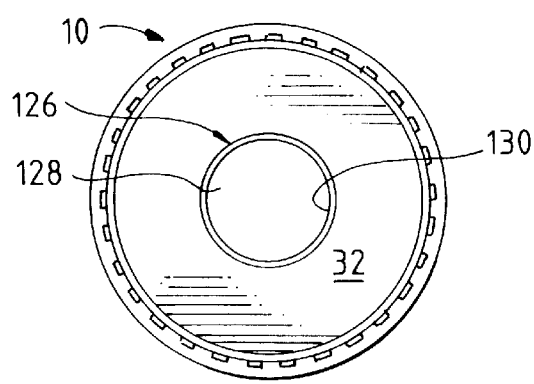
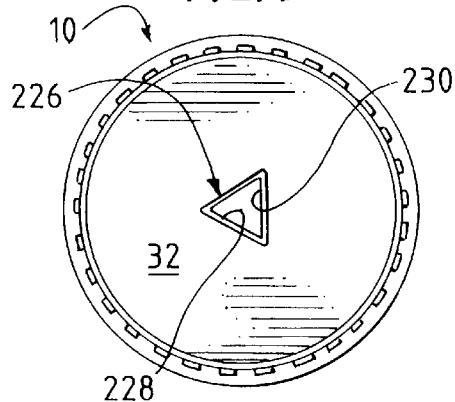
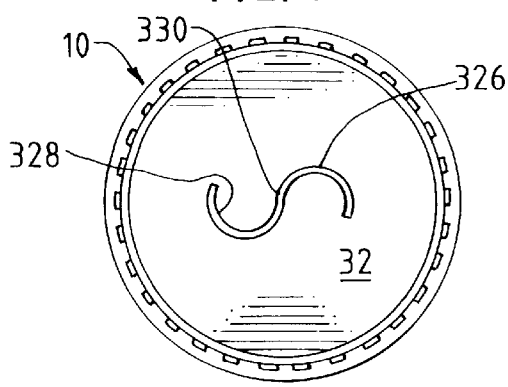

CLOSURE WITH MOLD RETAINING PROJECTION

FIELD OF THE INVENTION

This invention pertains to an injection molded closure cap. More particularly, the invention pertains to an injection molded closure formed with a projection to momentarily retain the closure in an associated mold block.

BACKGROUND OF THE INVENTION

Closures or caps for containers are used in a vast array of applications in immense quantities. As such, manufacture of these caps must be done in large quantities, and at high speeds, to maintain the relatively low cost of such closures.

Nevertheless, if one were to inspect such closures with a view toward the details thereof, one would recognize that these closures are highly engineered items. As such, tolerances for, for example, threading, internal diameter, cap depth and the like must be maintained in accordance with very strict standards and ranges.

In order to manufacturer closures in a cost-effective manner, many forming or molding apparatuses are configured to mold multiple caps in a single pass or operation of the apparatus. It is not uncommon for these apparatuses to mold as many as 128 closures in a single operation of the molding device.

Although there are numerous arrangements that are employed for closure molding apparatuses, it has been found that in an efficient molding apparatus the closures are molded in a horizontally-oriented manner. That is, the closures are molded with the top wall of the closure lying in a vertical plane. In this manner, the molding apparatus can be assembled to carry out the multiple molding operation in an efficient and cost effective manner, and to provide a machine that can be used in a relatively small physical plant location.

Those familiar with high speed, mass production injection molding will recognize that the closure, like many molded parts, must be ejected from the mold after it is formed. Ejection is typically carried out in a timed manner so that the part has had sufficient time to set to reduce part deformation. However, allowing the part to set too long in the mold block also has its drawbacks. First, the part may have become too rigid to eject without damaging portions or areas of the part, such as threads. Second, permitting the part to set too long reduces the time that the particular mold can be used to form a subsequent part, thus decreasing the machine's production time.

To this end, known injection molding devices include a mold block that is timed to separate to release the closure from the mold. Mold block opening is timed so that the molded part has sufficient time to set, without becoming too rigid, while making efficient use of the mold block. In this manner, the mold block portions reciprocate relative to one another to open, for releasing or ejecting the molded part.

A typical mold may include a cavity portion forming the outer surfaces of the closure and a core portion inserted into the cavity to form the inner closure surfaces and the container-engaging portions, such as threads and the like. In such an arrangement, a knock-out pin reciprocates through the core to eject or dislodge the closure therefrom as the mold portions separate from one another. It has, however, been observed that when the closure is ejected from the core, it can immediately fall away from the separating mold portions. When this happens, the closure can inadvertently fall into areas of the molding apparatus, such as a mold separating drive area, and become lodged in these undesirable areas. As a result, the molding apparatus must be shut down and the closure removed so that the apparatus can be restored to operation.

Accordingly, there exists a need for a cost-effective closure retention arrangement that is easily adapted for use in a high speed injection molding apparatus that prevents early or premature dislodging of the closure from the core plug. Desirably, such a retention arrangement is relatively inexpensive to incorporate into the closure and injection molding device, and does not adversely effect the ability to operate such an apparatus in a cost effectively manner to mass produce closures. Desirably, such a retention arrangement is adaptable for use in all types of closures including threaded closures, bayonet-mount closures and snap-type closures as well as a variety of sizes of such closures.

SUMMARY OF THE INVENTION

A molded closure for use with a container includes a top wall defining an generally planar inner surface and a skirt depending from the top wall generally perpendicular thereto. The skirt includes a container engaging member formed therein for securing the closure to the container.

The closure includes a retaining projection formed in the top wall contiguous with the inner surface and extending therefrom inwardly of the closure. The projection, which is formed as part of the molding process, extends from the surface perpendicular thereto and defines at least a pair of mold binding surfaces perpendicular to the top wall surface. The binding surfaces are formed in facing relation to one another.

In the molding process, the closure is formed in a heated state and, as the closure cools, the binding surfaces exert a binding force on the mold block at a location that forms a part of the projection, to momentarily retain the closure bound to the molding apparatus. Momentary retention of the closure in the mold prevents the closure from inadvertently dropping or falling into undesirable areas or regions of the molding apparatus, such as the mold block parting line surfaces.

In a preferred configuration, the molding apparatus includes a knock-out pin to dislodge the closure from the apparatus, and at least a portion of the projection is formed by the knock-out pin during molding.

The projection can be formed having any of a variety of shapes, such as a cruciform shape, a circular shape, a triangular shape, a serpentine shape and the like. Preferably, the projection has a rise of between about 10 mils and about 50 mils, and most preferably about 30 mils from the top wall inner surface. The projection can be centrally located on the top wall inner surface.

In an alternate embodiment, the closure includes a plug depending from the top wall inner surface and the projection is formed as part of the plug, along a portion thereof farthest from the top wall. Preferably, the plug has an inwardly angled portion at about the base of the plug that is contiguous with the projection.

Other features and advantages of the present invention will be apparent from the following detailed description, the accompanying drawings, and the appended claims.

BRIEF DESCRIPTION OF THE FIGURES

FIG. 2A is an enlarged view of the circled region as indicated in FIG. 2;

FIG. 3 is a bottom view of the closure illustrating a cruciform mold retaining projection;

FIG. 4 is a bottom view of an alternate embodiment of the closure illustrating a circular mold retaining projection;

FIG. 5 is a bottom view of another alternate embodiment of the closure illustrating a triangular mold retaining projection; and FIG. 6 is a bottom view of yet another alternate embodiment of the closure illustrating a serpentine mold retaining projection.

DETAILED DESCRIPTION OF THE PREFERRED EMBODIMENTS

Figure 1:
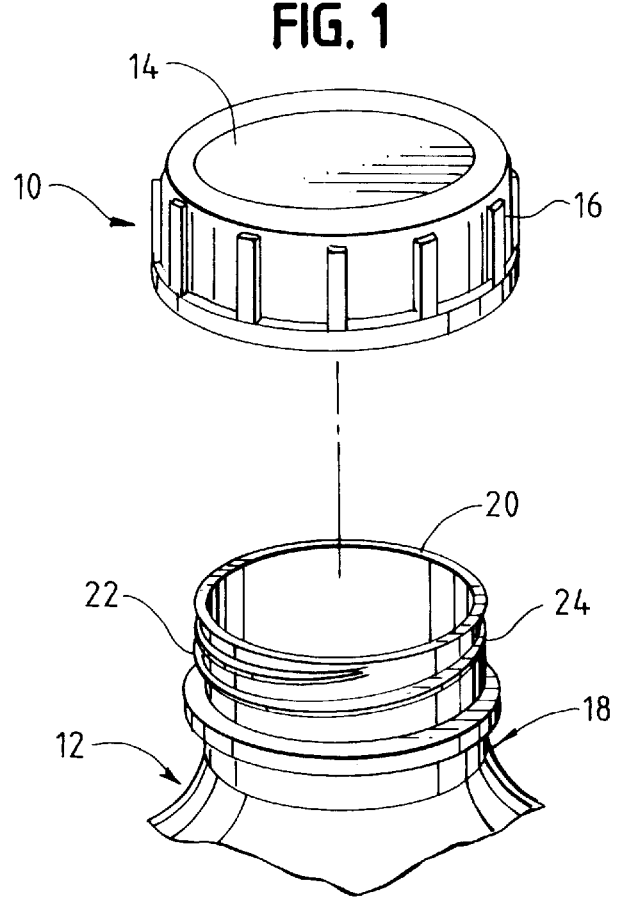
FIG. 1 is an exploded view illustrating a closure with an associated container, the closure having a mold retaining projection embodying the principles of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring now to the figures and in particular to FIG. 1, there is shown a closure 10 in an exploded arrangement with a container 12 to which the closure 10 is fitted. The closure 10 includes a circular top wall portion 14 and an annular skirt 16 depending from the top wall 14. A container 12 onto which the closure 10 is fitted, such as the exemplary threaded container, includes a neck 18 defining a land surface 20 at the top thereof and a finish indicated at 22 onto which the closure 10 engages the container 12. The finish 22 can include any of a number of different types of closure engaging configurations, such as the illustrated threaded engagement 24, a bayonet mount (not shown), a snap-type mount (not shown) and the like, all of which engagement configurations are within the scope of the present invention.

The closure 10 includes a retaining projection 26 extending from the top wall 14 inwardly of the closure 10. The projection 26 can be formed in a variety of configurations, such as the illustrated "+" or "x", i.e., cruciform configuration. The projection 26 includes at least one pair of surfaces that are facing or directed toward one another, such as the surfaces indicated at 28 and 30. The surfaces 28, 30 are substantially perpendicular relative to an inner surface 32 of the closure top wall 14.

As will be understood by those skilled in the art, the configuration of the projection 26 can take many forms, alternate embodiments of which are illustrated in FIGS. 4 through 6, in which FIG. 4 illustrates a circular projection 126, FIG. 5 illustrates a triangular projection 226 and FIG. 6 illustrates a serpentine projection 326. The projections 126, 226, 326 of FIGS. 4–6, each include surfaces that are directed to or face one another, such as surfaces 128, 130 of projection 126, surfaces 228, 230 of projection 226, and surfaces 328, 330 of projection 326.

The projection, such as projection 26, rises or extends, as indicated at 34, from the inner surface 32 of the top wall 14 a distance of between about 10 thousandths of an inch (mils) and about 50 mils, and preferably about 30 mils. In this manner, the projection 26 is formed using a minimal amount of material, e.g., plastic, which, in turn, reduces the material cost of the closure 10 while providing sufficient area to retain the closure 10 momentarily engaged with or bound to the mold block as it is ejected therefrom. As will be recognized by those skilled in the art, the quantity and thus the costs for the closure material should be maintained as low as possible, without sacrificing closure quality. In a present embodiment of a 39 mm closure, that is a closure 10 having a diameter of 39 mm across the skirt 16, the cruciform projection 26 has a length l along each side of about 12 mm to 14 mm, with a rise 34 of about 30 mils.

Figure 2:
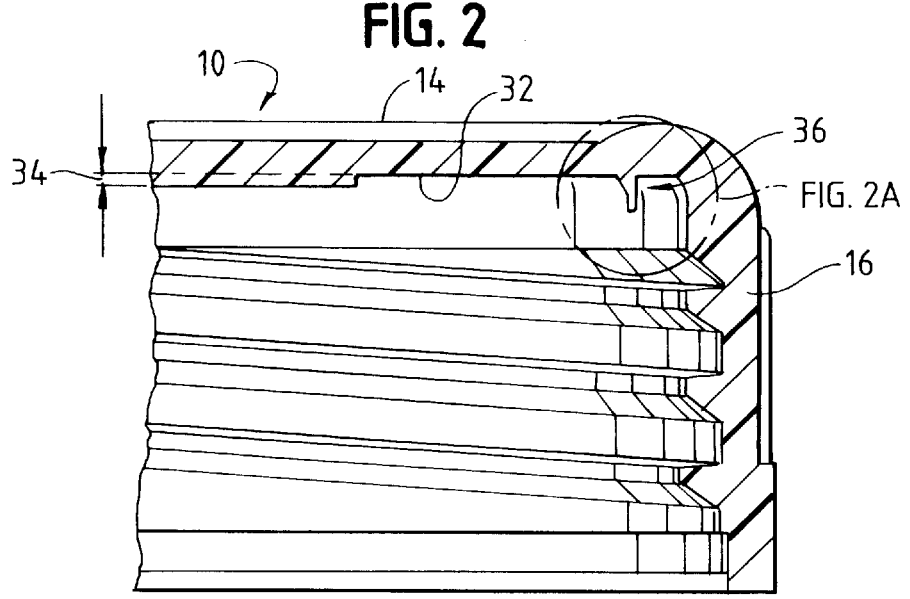
FIG. 2 is a partial cross-sectional view of the closure of FIG. 1, taken along line 2—2 of FIG. 3, illustrating both a cruciform projection and a plug formed with a mold retaining projection.

An alternate embodiment of the projection is indicated at 426 in FIGS. 2 and 2A, in which the projection 426 is incorporated into a plug 36 the depends from the inner surface 32 of the top wall 14. The plug 36, as will be recognized by those skilled in the art, can serve as a seal between the container contents and the environs. To this end, when the closure 10 is fitted onto the container 12, the plug 36 inserts into the container neck 18 to provide a seal. In a typical plug seal, the plug portion 36 includes a tapered or angled wall, as indicated at 38, that angles outwardly from the plug base 42 inner surface, as indicated at 40. This embodiment of the projection 426 is incorporated into the plug 36 by a non-tapered upper wall portion 432, in which that portion of the wall, farthest from the closure top wall 14, includes facing sides 428, 430 that are perpendicular relative to the top wall 14 and coaxial relative to the skirt 16.

In one method for forming the projection, the projection, or at least a part of the projection, is formed by the molding apparatus knock-out pin. That is, the knock-out pin is formed as a separate part of the apparatus that reciprocates relative to the inner core portion of the mold. During the closure forming operation, the knock-out pin is recessed from that portion of the core that forms the top wall inner surface. As the plastic material flows into the mold, the projection is formed within the knock-out pin recess. When the closure has sufficiently cooled so that it can be ejected from the mold, the knock-out pin reciprocates relative to the core forming portion of the mold, toward the closure top wall, to eject or dislodge the closure from the mold.

While not wishing to be bound by theory, it is believed that the present projections function by way of the physical interaction of the projection with the mold block that results from cooling of the plastic material. As the plastic cools, it shrinks and compresses, at least in part, against the sides of the mold block that form the projection. Compression of the plastic against the mold block results in sufficient frictional or binding forces to maintain the closure momentarily engaged with the knock-out pin for a short, yet sufficient period of time for the pin to return to its retracted position, to allow the mold block portions to separate prior to the closure falling from the knock-out pin. Binding of the projection with the mold block delays the closure falling from the mold for a period of time to permit the mold blocks to fully separate. In this manner, as the closure falls from the mold block, it can be directed into a product bin, rather than falling into an undesired area of the molding apparatus, such as the mold drive assembly.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A molded closure for use with a container, the closure being made in an associated molding apparatus having an associated mold, the closure comprising:

a top wall defining an generally planar inner surface;

a skirt depending from the top wall generally perpendicular thereto and including a container engaging member formed therein; and a single mold retaining projection for momentarily retaining the closure with the associated mold formed in the top wall contiguous with the inner surface and extending therefrom inwardly of the closure, the projection extending from the surface perpendicular thereto and defining at least a pair of mold binding surfaces extending along contiguous portions of the projection, the binding surfaces being formed perpendicular to the top wall surface, wherein the projection is formed having a generally triangular shape and is spaced inwardly of a juncture of the top wall and the skirt.

2. The molded closure in accordance with claim 1 wherein the projection has a rise of between about 10 mils and about 50 mils from the top wall inner surface.

3. The molded closure in accordance with claim 2, wherein the projection has a rise of about 30 mils from the top wall inner surface.

4. The molded closure in accordance with claim 1 wherein the projection is centrally located on the top wall inner surface.

5. A molded closure for use with a container, the closure being made in an associated molding apparatus having an associated mold, the closure comprising:

a top wall defining an generally planar inner surface;

a skirt depending from the top wall generally perpendicular thereto and including
a container engaging member formed therein; and
a single mold retaining projection for momentarily retaining the closure with the associated mold formed in the top wall contiguous with the inner surface and extending therefrom inwardly of the closure, the projection extending from the surface perpendicular thereto and defining at least a pair of mold binding surfaces extending alone continuous portions of the projection, the binding surfaces being formed perpendicular to the top wall surface, wherein the projection is formed having a generally cruciform shape and is spaced inwardly of a juncture of the top wall and the skirt.

6. A molded closure for use with a container, the closure being made in an associated molding apparatus having an associated mold, the closure comprising:

a top wall defining an generally planar inner surface;

a skirt depending from the top wall generally perpendicular thereto and including
a container engaging member formed therein; and
a single, continuous, non-interrupted mold retaining projection for momentarily retaining the closure with the associated mold formed in the top wall contiguous with the inner surface and extending therefrom inwardly of the closure, the projection extending from the surface perpendicular thereto and defining at least a pair of mold binding surfaces extending along contiguous portions of the projection, the binding surfaces being formed perpendicular to the top wall surface wherein the projection is formed having a generally circular shape having an open central portion and is spaced inwardly of a juncture of the top wall and the skirt, wherein when the closure is engaged with the container, the projection is spaced inwardly of the container so as not to contact an inner surface of the container.

7. A molded closure for use with a container, the closure being made in an associated molding apparatus having an associated mold, the closure comprising:

a top wall defining an generally planar inner surface;

a skirt depending from the top wall generally perpendicular thereto and including
a container engaging member formed therein; and
a single mold retaining projection for momentarily retaining the closure with the associated mold formed in the top wall contiguous with the inner surface and extending therefrom inwardly of the closure, the projection extending from the surface perpendicular thereto and defining at least a pair of mold binding surfaces extending along contiguous portions of the projection, the binding surfaces being formed perpendicular to the top wall surface, wherein the projection is formed having a generally S-shaped configuration and is spaced inwardly of a juncture of the top wall and the skirt.

* * * * *